US009906189B2

(12) United States Patent
Ben-Yaakov et al.

(10) Patent No.: US 9,906,189 B2
(45) Date of Patent: Feb. 27, 2018

(54) RESONANT SWITCHED-CAPACITOR GYRATOR-TYPE CONVERTER WITH LOCAL MPPT CAPABILITY FOR PV CELLS

(71) Applicant: BEN-GURION UNIVERSITY OF THE NEGEV RESEARCH & DEVELOPMENT AUTHORITY, Beer Sheva (IL)

(72) Inventors: Shmuel Ben-Yaakov, Beer Sheva (IL); Alon Cervera, Beer Sheva (IL); Alon Blumenfeld, Ashkelon (IL); Mor Mordechai Peretz, Lehavim (IL)

(73) Assignee: BEN-GURION UNIVERSITY OF THE NEGEV RESEARCH & DEVELOPMENT AUTHORITY, Beer Sheva (IL)

( * ) Notice: Subject to any disclaimer, the term of this patent is extended or adjusted under 35 U.S.C. 154(b) by 449 days.

(21) Appl. No.: 14/419,592

(22) PCT Filed: Aug. 5, 2013

(86) PCT No.: PCT/IL2013/050662
§ 371 (c)(1),
(2) Date: Feb. 4, 2015

(87) PCT Pub. No.: WO2014/024185
PCT Pub. Date: Feb. 13, 2014

(65) Prior Publication Data
US 2015/0214887 A1    Jul. 30, 2015

Related U.S. Application Data

(60) Provisional application No. 61/679,738, filed on Aug. 5, 2012.

(51) Int. Cl.
H02S 40/30    (2014.01)
H02M 3/07    (2006.01)
(Continued)

(52) U.S. Cl.
CPC .............. H02S 40/30 (2014.12); H02J 1/00 (2013.01); H02M 1/083 (2013.01); H02M 3/07 (2013.01);
(Continued)

(58) Field of Classification Search
CPC ....................................................... H02S 40/30
(Continued)

(56) References Cited

U.S. PATENT DOCUMENTS

5,710,504 A * 1/1998 Pascual ................. H02J 7/0018
180/65.8
2012/0043923 A1    2/2012 Ikriannikov et al.

FOREIGN PATENT DOCUMENTS

WO    2010081746 A2    7/2010
WO    2011051943 A2    5/2011

OTHER PUBLICATIONS

International Search Report dated Nov. 24, 2013 for PCT/IL2013/050662.
(Continued)

Primary Examiner — Joseph Chang
(74) Attorney, Agent, or Firm — Kinney & Lange, P.A.

(57) ABSTRACT

A method for increasing the power extraction capability out of Differential Power Processor (DPP) system, which consists of a chain of N serially connected PV elements and an array of N−1 gyrator-type converters which are current sourcing resonant Switched Capacitor Converters (SCCs), each of which being connected in parallel with two adjacent PV elements. Accordingly, local MPPT is continuously performed, by each gyrator-type converter, to one of its two connected PV elements by sinking or sourcing current to/from the neighboring PV element. Whenever a mismatch in the MPPs is detected, the gyrator-type converters are used to provide the difference in current that is required for each of the PV elements to operate at its MPP, such that the amount of power processed by each gyrator-type converter in the chain is linearly proportional to its location in the chain, with respect to the mismatched PV element.

14 Claims, 7 Drawing Sheets

(51) Int. Cl.
    *H02M 1/08*     (2006.01)
    *H02J 1/00*     (2006.01)
    *H02M 1/00*     (2006.01)

(52) U.S. Cl.
    CPC ...... *H02M 2001/0058* (2013.01); *Y02E 10/56* (2013.01); *Y10T 307/549* (2015.04)

(58) Field of Classification Search
    USPC .......................................................... 307/52
    See application file for complete search history.

(56) References Cited

OTHER PUBLICATIONS

Written Opinion of the International Searching Authority dated Nov. 24, 2013 for PCT/IL2013/050662.

Jason Strauth et al., "A High-Voltage CMOS IC and Embedded System for Distributed Photovoltaic Energy Optimization with Over 99% Effective Conversion Efficiency and Insertion Loss Below 0.1%", 2012 IEEE International Solid-State Circuits Conference, Feb. 20, 2012, pp. 100-102.

Shmuel (Sam) Ben-Yaakov et al., "Design and Evaluation of a Modular Resonant Switched Capacitors Equalizer for PV Panels", 2012 IEEE, Sep. 1, 2012, pp. 4129-4136.

Kenichiro Sano and Hideaki Fujita, "A Resonant Switched-Capacitor Converter for Voltage Balancing of Series-Connected Capacitors", Nov. 2, 2009, PEDS2009 pp. 683-688.

\* cited by examiner

RESONANT SWITCHED-CAPACITOR GYRATOR-TYPE CONVERTER WITH LOCAL MPPT CAPABILITY FOR PV CELLS

FIELD OF INVENTION

The invention is in the field of switched power converters. More particularly, the invention relates to the implementation of a high efficiency bi-directional gyrator-type resonant Switched Capacitor Converter (SCC) with Local MPPT capability for photovoltaic systems (PV) Systems.

BACKGROUND OF THE INVENTION

Photovoltaic systems are arrangements of components designed to supply usable electric power for a variety of purposes, by converting solar radiation (sunlight) into usable direct current (DC) electricity. A PV array (also called a solar array) consists of multiple photovoltaic modules (solar panels). A photovoltaic system for residential, commercial, or industrial energy supply normally contains an array of photovoltaic (PV) modules, DC to alternating current (AC) power converters, a maximum power point tracker (MPPT), and optionally a battery system and a charger.

For any given set of operating conditions, PV cells have a single operating point where the values of the current and voltage of the PV cell result in a maximum power output. Maximum Power Point Tracking (MPPT) is a technique to extract the maximum available power out of the solar panels. Since the performance of solar cells depend on environmental conditions and have non-linear output efficiency, the MPPT system applies the proper loading conditions on the PV array such that maximum power is extracted at any operating point. Possible realization of MPPT can be obtained by apriori information of the PV system, or by sampling the output of the PV cells and adjusting the power converter's input characteristics to obtain maximum power for any given environmental conditions.

A load with resistance $R=V/I$ equal to the reciprocal of this value draws the maximum power from the device. This is sometimes called the characteristic resistance of the PV cell. This is a dynamic quantity which changes depending on the level of illumination, as well as other factors such as temperature and the age of the PV cell. If the resistance is lower or higher than this value, the power drawn will be less than the maximum available, and thus the PV cell will not be used as efficiently as it could be. Maximum power point trackers utilize different types of control circuits or logic to search for this point and thus to allow the converter circuit to extract the maximum power available from a PV cell.

Serially connected PV arrays are widely used in such PV systems. However, full or partial shading of a serially connected PV array, severely impacts the power that can be extracted from the chain. Generally, two groups of power processing solutions have been proposed to resolve the shading problem.

"Per panel photovoltaic energy extraction with multilevel output DC-DC switched capacitor converters," (J. J. Cooley, and S. B. Leeb, Twenty-Sixth Annual IEEE, APEC 2011, pp. 419-428) and "Improved Energy Capture in Series Chain Photovoltaics via Smart Distributed Power Electronics," (Linares et al, Twenty-Fourth Annual IEEE APEC 2009, pp. 904, 910) propose power processing by assigning a dedicated converter/inverter per element in the PV array. However, this solution is costly, and requires that each of the dedicated converters will process the full power out of the PV element, which translates into increased losses.

"Generation control circuit for photovoltaic modules," (Shimizu et al, IEEE Transactions on Power Electronics, vol. 16, no. 3, pp. 293-300, May 2001), "A returned energy architecture for improved photovoltaic systems efficiency," (Nimni et al, Proceedings of 2010 IEEE ISCAS 2010, pp. 2191-2194) and "Centralized MPPT with chain current diverter for solving the series connection problem in photovoltaic power generation system," Kadri et al, 2011 ICCEP, pp. 116-123, June 2011) disclose solutions that keep the series connection of the elements intact, and process mismatched currents due to the shaded unit(s) using parallel circuitry that channels the power difference to/from the main bus. By processing only power differences between the PV elements, conversion losses are minimized, while improving reliability.

A unique advantage of the differential power processing architecture (initially proposed in G. R. Walker, J. Xue, and P. Sernia, "PV String Per-Module Maximum Power Point Enabling Converters," presented at the Australasian Universities Power Engineering Conference, 2003, and in G. R. Walker; J. C. Pierce, "PhotoVoltaic DC-DC Module Integrated Converter for Novel Cascaded and Bypass Grid Connection Topologies—Design and Optimisation," 37th IEEE Power Electronics Specialists Conference, 2006 (PESC 2006), pp. 1, 7, 18-22 Jun. 2006) is that Maximum Power Point Tracking (MPPT) can be obtained locally, on a PV element level, by processing only the necessary amount of power needed to achieve Maximum Power Point (MPP). Several converter realizations have been proposed as candidates as Differential Power Processors (DPP), mainly derived from battery management applications.

A Switched Capacitor Converter (SCC), has a voltage equalizer with simple open-loop control, relying on the assumption that MPP voltage deviation is negligibly small due to change in irradiance level. This approach stands out in its simplicity, high self-efficiency and low cost. However, it lacks MPPT capability without introducing losses. A buck-boost topology has also been proposed, acting as an equalizer [R. Kadri, J. Gaubert, and G. Champenois, "Centralized MPPT with string current diverter for solving the series connection problem in photovoltaic power generation system," 2011 International Conference on Clean Electrical Power, (ICCEP), pp. 116-123, 14-16 Jun. 2011], and further developed to obtain local MPPT by differential processing [P. S. Shenoy; K. A. Kim; B. B. Johnson; P. T. Krein, "Differential Power Processing for Increased Energy Production and Reliability of Photovoltaic Systems," IEEE Transactions on Power Electronics, vol. 28, no. 6, pp. 2968, 2979, June 2013], in order to keep all PV units in MPP. However, compared to SCC technology of the same power level, it is bulkier in volume due to the large magnetic element required.

Converter topologies such as switched-capacitor type (described for example in "A resonant switched-capacitor converter for voltage balancing of series-connected capacitors," by Sano et al., International Conference on PEDS 2009, pp. 683, 688) or a buck-boost type (described for example in "A Review of Cell Equalization Methods for Lithium Ion and Lithium Polymer Battery Systems", Moore et al., SAE 2001 World Congress, No. 2001-01-0959, March 2001), were originally proposed for battery equalization and realized for PV applications have many merits. However, their efficiency range is limited and SCC configuration lacks MPPT capability. In a buck-boost configuration, the efficiency range is somewhat limited around the nominal power level, and there is a trade-off between the size and performance of the converter.

All the conventional methods described above failed to propose a differential power processing converter for PV systems, which combines small dimensions and high conversion efficiency over a wide range.

It is therefore an object of the present invention to provide a new DPP topology that overcomes the limitations of conventional DPPs.

It is another object of the present invention to provide a new DPP topology that combines the benefits of reduced size SCC and current sourcing properties with high efficiency over a wide range.

It is a further object of the present invention to provide a new DPP topology that is fully capable of performing local MPPT with SCC technology.

It is a further object of the present invention to provide a new DPP topology in which only the mismatch power between PV elements is processed while converging each of the elements into its corresponding MPP.

Other objects and advantages of the invention will become apparent as the description proceeds.

SUMMARY OF THE INVENTION

The present invention is directed to a method for increasing the power extraction capability of a chain of serially connected PV elements, which comprises the following steps:
a) for each pair of adjacent PV elements, connecting a gyrator-type converter being a current sourcing resonant Switched Capacitor Converter (SCC), such that each gyrator-type converter is connected in parallel with two adjacent PV elements;
b) continuously performing, by each gyrator-type converter, local MPPT to one of its two connected PV elements by sinking or sourcing current to/from the neighbouring PV element; and
c) whenever a mismatch in the MPPs is detected, using the gyrator-type converters to provide the difference in current that is required for each of the PV elements to operate at its MPP, such that the amount of power processed by each gyrator-type converter in the chain is proportional to its location in the chain with respect to the mismatched PV element.

Each gyrator-type converter may be bi-directional and capable of performing step-up and step-down operation.

The present invention is also directed to a Differential Power Processor (DPP) system for increasing the power extraction capability out of a chain of PV elements, which comprises:
a) a chain of N serially connected PV elements;
b) an array of N−1 gyrator-type converters being a current sourcing resonant Switched Capacitor Converter (SCC), each of which being connected in parallel with two adjacent PV elements;
c) continuously performing, by each gyrator-type converter, local MPPT to one of its two connected PV elements by sinking or sourcing current to/from the neighbouring PV element; and
d) whenever a mismatch in the MPPs is detected, using the gyrator-type converters to providing the difference in current that is required for each of the PV elements to operate at its MPP, such that the amount of power processed by each gyrator-type converter in the chain is linearly proportional to its location in the chain, with respect to the mismatched PV element.

Each gyrator-type converter, connected in parallel with two adjacent serially connected PV elements, may comprise:

a) a resonant tank circuit consisting of a flying capacitor C which is serially connected to an inductor L;
b) a first switch connecting between a first contact of the resonant tank circuit and a contact of a first PV element;
c) a second switch connecting between the first contact of the resonant tank circuit and the common contact between the PV elements;
d) a third switch connecting between the second contact of the resonant tank circuit and the common contact;
e) a fourth switch connecting between the other contact of the resonant tank circuit and a contact of the second PV element;
f) a control circuit for controlling the operation of the switches, which in a first operation mode, upon detecting a negative mismatch in the MPP of the second PV element, is adapted to:
  f.1) turn the first and third switches on commence a charge state, during which the flying capacitor C is resonantly charged from the first PV element;
  f.2) at zero current, turn the first and third switches off to introduce time-delay, if required;
  f.3) turn the second and fourth switches on, to discharge the flying capacitor resonantly onto the second PV element;
  f.4) at zero current, short-circuit the resonant tank circuit by turning the second and the third switches on, to reverse the polarity of the voltage across the flying capacitor;
g) and, which in a second operation mode, upon detecting a positive mismatch in the MPP of the second PV element, is adapted to:
  g.1) turn the second and fourth switches on commence a charge state, during which the flying capacitor C is resonantly charged from the second PV element;
  g.2) at zero current, turn the second and fourth switches off to introduce time-delay, if required;
  g.3) turn the first and third switches on, to discharge the flying capacitor resonantly onto the first PV element; and
  g.4) at zero current, short-circuit the resonant tank circuit by turning the second and the third switches on, to reverse the polarity of the voltage across the flying capacitor.

Transfer of energy between PV elements may be facilitated in a controlled manner, in portions, where the excess charge that is not transferred from the first PV element to the second PV element is recycled in the circuit.

Each gyrator-type converter may be bi-directional and capable of performing step-up and step-down operation.

The control circuit may be adapted to control the power flow direction by changing the switching sequence and regulate the amount of charge transferred to the second element using pulse density modulation (PDM), that is, by introducing time-delay between the charge and the discharge states of the resonant tank circuit, or by creating packets of pulses using ON-OFF burst mode control.

When the power should be transferred from the first PV element to the second PV element, the control circuit may be adapted to control the switches to:
a) charge resonant tank circuit from the first PV element;
b) add time-delay according to the necessary amount of power to be transferred;
c) discharge the resonant tank circuit on the second PV element; and
d) reverse the polarity of the voltage across the flying capacitor.

When power should be transferred from the second PV element to the first PV element, the control circuit may be adapted to control the switches to:

a) discharge the resonant tank circuit on the second PV element;
b) charge resonant tank circuit from the first PV element; and
c) add time-delay according to the necessary amount of power to be transferred; and
d) reverse the polarity of the voltage across the flying capacitor.

Local MPPT on at least one PV element may be performed by using Hill-Climbing (HC) scheme. The correction signal of the Hill-Climbing (HC) scheme may be modified to frequency, incremented by fixed steps.

Local MPPT on at least one PV element may also be performed by using Perturb and Observe (P&O) scheme.

The proportion of the power processed by each converter in the chain may be linear with respect to the mismatched PV element.

DETAILED DESCRIPTION OF THE EMBODIMENTS OF THE INVENTION

The present invention proposes an enhanced Differential Power Processing (DPP) topology and principle of operation for photovoltaic systems (PV) that uses a novel resonant switched-capacitor converter as a voltage-dependent current-source and is regulated by dead-time or frequency control, while maintaining local Maximum Power Point Tracking (MPPT) capability, zero current switching (ZCS), high efficiency over wide operation range, and reduced size. This resonant SCC converter is of low-volume and high-efficiency with extended operation range, and is capable of performing local MPPT.

Figure 1A:
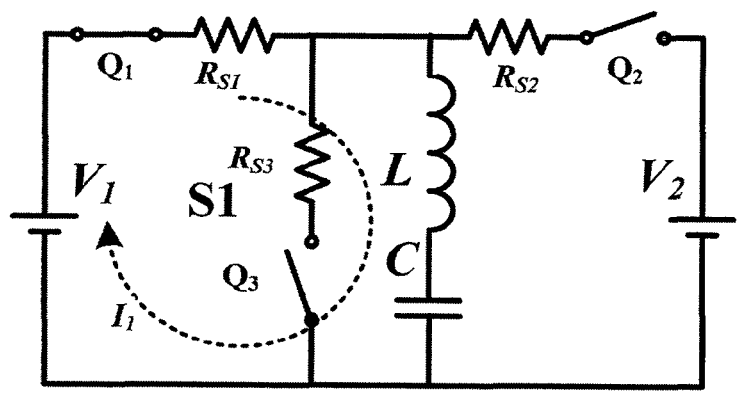
FIGS. 1a to 1c schematically shows the a resonant switched capacitor converter configuration and operation principle in different states, according to an embodiment of the invention.
Figure 1B:
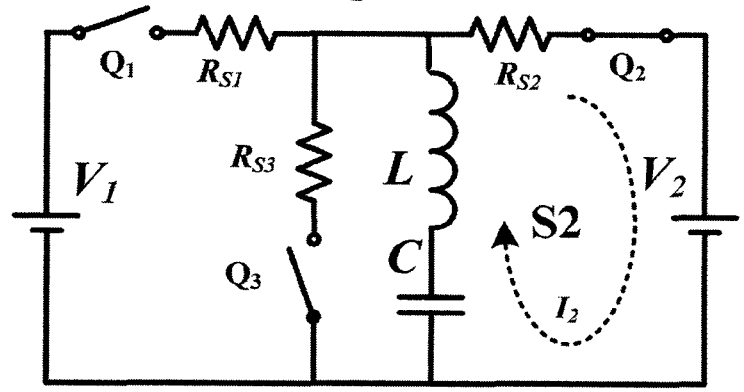
Figure 1C:
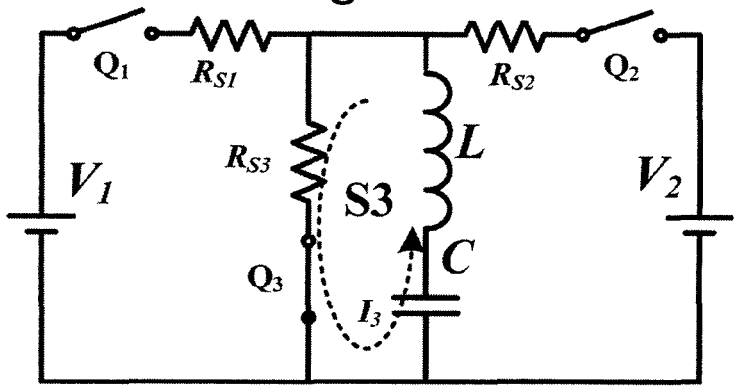

Resonant Switched-Capacitor Converter (SCC) with Voltage-Dependent Current-Source Properties International Patent Application Publication WO 2014/024184 discloses an implementation of the novel resonant SCC that disengages the efficiency of the system from the voltage gain, as illustrated in FIGS. 1a to 1c. Due to this disengagement, the converter efficiency may be very high and depends primarily on the conduction losses. The converter operates as a voltage-dependent current source, maintains soft switching for the entire operation range, and exhibits bi-directional power flow with wide voltage gains. FIGS. 1a, 1b and 1c illustrate the switching schemes during charge, discharge and balance states, respectively.

The converter presented in FIGS. 1a to 1c, is a modification of a conventional soft-switched SCC, which includes two switches $Q_1$ and $Q_2$ and a resonant tank consisting of a capacitor C and an inductor L. The additional switch $Q_3$ is added to introduce an alternative resonant path $I_3$ of the current to balance the residual charge of the flying capacitor C, i.e. it restores the flying capacitor's voltage to its original state by reversing its polarity. The mechanism of polarity reversal (which causes charge balancing) causes the disengagement of the efficiency dependency from the input/output voltage. Appropriately controlling the sequence of the switches enables to control the power flow direction, and hence, bidirectional step up/down operation. In this novel implementation, by balancing the residual charge of the flying capacitor C, the excess energy is reused in the circuit and therefore, the efficiency is increased. The inductor L participates in the energy reuse process by appropriately transferring the charges as desired. Therefore, the values of L and C are appropriately selected to obtain the amount of charges to be transferred from $V_1$ to $V_2$ or vice-versa.

The topology illustrated in FIGS. 1a to 1c requires four-quadrant (bi-directional) switches ($Q_1$, $Q_2$, and $Q_3$) that operate in a synchronous/complementary action. This is required to support bi-directional and non-inverting step up/down operation in a single configuration. However, for more specific cases such as unidirectional power flow and/or specific conversion type (up or down), the amount of switches and the configuration complexity can be significantly reduced.

Figure 2:
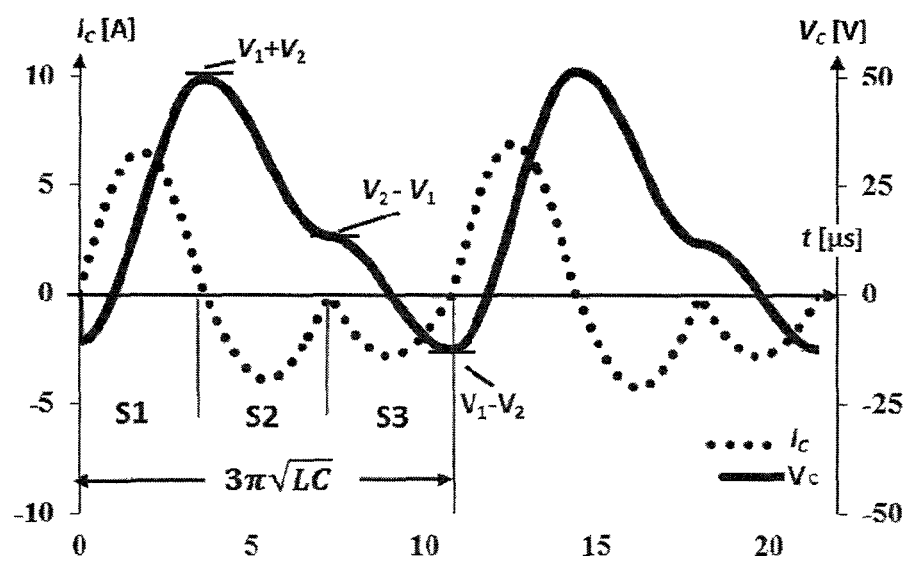
FIG. 2 schematically shows typical simulated waveforms of the flying capacitor voltage and current in the circuit of FIGS. 1a to 1c.

FIG. 2 illustrates the operation of the converter shown in FIGS. 1a to 1c, for one steady-state charge/discharge/balance cycle, while showing the flying capacitor's voltage $V_C$ and the resonant tank current $I_C$, for a case of a non-unity step-up conversion. The Circuit parameters were: Vin=20 V, Vo=31 V, Rs=0.15Ω, L=5.2 μH, C=0.25 μF.

By turning switch $Q_1$ on, a charging state (S1) is commenced, during which the flying capacitor C resonantly charges from the input $V_1$. At zero current, $Q_1$ is turned off and $Q_2$ is turned on, thereby initiating a discharging state S2. At this point, the flying capacitor C resonantly discharges onto the output capacitor (not shown). Since the input voltage $V_1$ and the output voltage, $V_2$ have different values, only a portion of the charge is delivered to the output. This results in a capacitor's voltage (Vc=$V_2$−$V_1$) that is different than the capacitor's voltage (Vc=$V_1$−$V_2$) at the starting point of S1. The amount of voltage difference (neglecting parasitics) equals to twice the residual voltage of the flying capacitor and is given by (ΔVc=2$V_2$−2$V_1$). By turning $Q_3$ on, a charge balancing state S3 is initiated, during which the resonant tank is short-circuited. This creates the required charge-balance and reverses the polarity of the flying capacitor's voltage, such that the voltage at the end of state S3 equals to the voltage at the beginning of state S1 and thereby, the unwanted runaway effect is compensated.

The addition of a third, charge balancing state S3 to the switching sequence transforms the resonant SCC into a voltage dependent current-sourcing converter that (neglecting losses) is capable of accommodating any input to output voltage gain (larger and smaller than unity). Under steady-state conditions, the order of charge/discharge/balance sequence does not affect the operation of the converter for either step up or down conversion. The order of the sequence will govern the power flow direction, i.e. from $V_1$ to $V_2$ or from $V_2$ to $V_1$. To deliver power from $V_1$ to $V_2$ the switching sequence will be S1→S2→S3. This switching sequence causes charging from $V_1$, followed by discharging on $V_2$, followed by reversing the flying capacitor polarity. In the case of power to be delivered from $V_2$ to $V_1$, the sequence will be changed to S2→S1→S3. The duration of each switching state is ½ the resonant period and consists of three half resonant states. Hence, the switches are turned on and off at ZCS. This way, energy from the input is transferred to the output in a controlled manner, in portions, where the excess charge that is not transferred to the output is recycled in the converter's circuit.

According to another embodiment, the energy accumulating component may be the inductor L (rather than the capacitor C). This mode of operation exploits the duality between a charged capacitor that remains in open circuit and a charged inductor that remains short-circuited.

Voltage regulation may be applied by introducing time delay between switching states, using Pulse Density Modulation (PDM—a form of modulation according to which, specific amplitude values of an analog signal are encoded into pulses with relative density that corresponds to the amplitude of the analog signal) by applying delay between consecutive sequences, or by creating packets using ON-OFF burst mode control. The resistors $R_{s1}$, $R_{s2}$ and $R_{s3}$ in FIGS. 1a to 1c represent the parasitic resistances in each loop and are assumed to be negligibly small in the analysis for the current and voltage conversion ratios.

Differential Power Processing

The main goal of differential power processing in PV systems is to maximize the power conversion efficiency by processing only a small portion of the power being produced.

Figure 4:
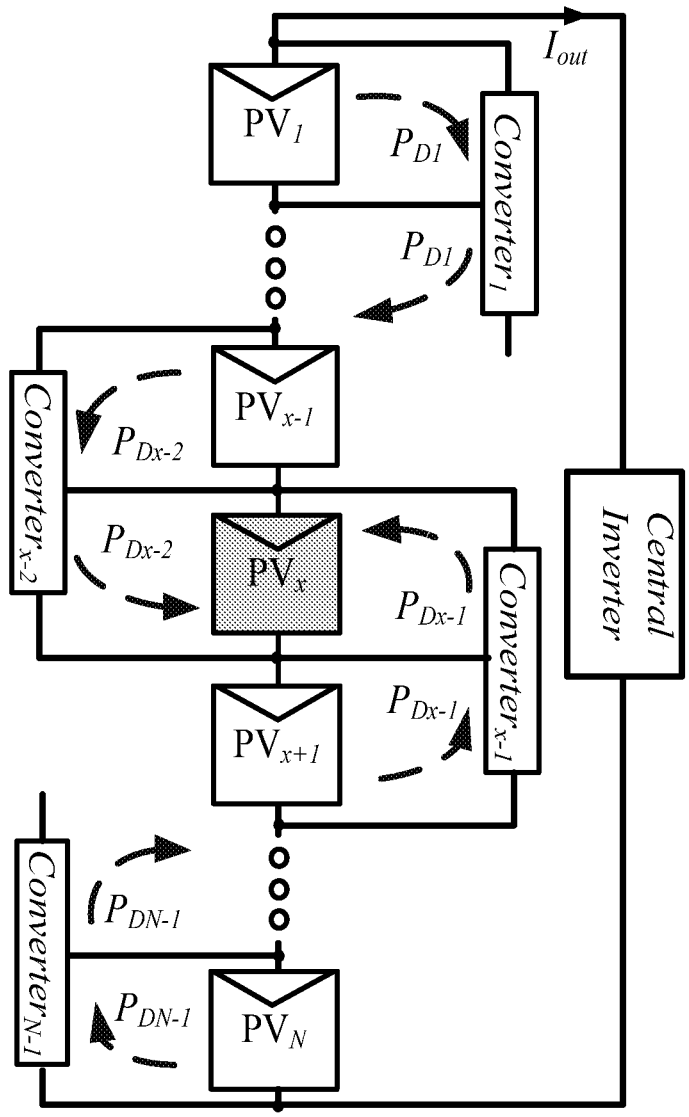
FIG. 4 is an example of power flow for a chain of N serially connected PV panels connected to N−1 gyrator-type DPPs with a shaded PV.

FIG. 4 shows a DPP system and power flow for a chain of N PV panels, according to an embodiment of the invention. In this example, the chain is connected to N−1 gyrator-type DPPs with a shaded PV at a location x along the chain $PV_1, \ldots, PV_x, \ldots, PV_N$.

The DPP system consists of a chain of N serially connected PV elements and N−1 current sourcing converters, each of which connected in parallel with two adjacent PV elements. The differential power passes along the chain in a bucket-brigade pattern (a discrete-time analogue delay line, which consists of a series of capacitance sections, where the stored analogue signal, or a part of it, is moved along the line of capacitors). Each converter performs local MPPT to one of its two connected PVs by sinking or sourcing current to/from the neighboring PV element. A central grid-connected inverter is still used to interact with the grid and to track the global MPPT. Effectively, it also performs the local MPPT for the $n^{th}$ element.

The differential converters Converter$_1$, ..., Converter$_{N-1}$, are needed only in case of mismatch in the MPPs, there only a portion of the power is processed by providing the difference in current that is required for each of the PV elements to operate at their MPP. The amount of power processed by each converter in a chain of N PV elements to bring the mismatched element $PV_x$, to its MPP can be expressed as:

$$P_{Dj} = \begin{cases} \dfrac{P_0 - P_s}{N} j, & j < x \\ \dfrac{P_0 - P_s}{N}(N-j), & j \geq x \end{cases} \quad \text{(Eq. 1)}$$

where the j represents the location of a converter in the chain, Ps is the maximum power of the shaded element and $P_0$ is the power of a non-shaded elements at their MPP. It can be observed from Eq. 1 that converters which are adjacent to the shaded element $PV_x$ are required to process most of the power, while other PV elements, located farther in the chain, contribute a smaller portion of the power, which is linearly proportional to their location with respect to the mismatched element $PV_x$. From Eq. 1, it would be highly advantageous that the efficiency of the converter will be independent of the operating conditions.

A current-sourcing converter that operates as a DPP is thus required to be bi-directional and capable of step-up (where the output voltage is greater than its input voltage) and step-down operation.

Figure 3:
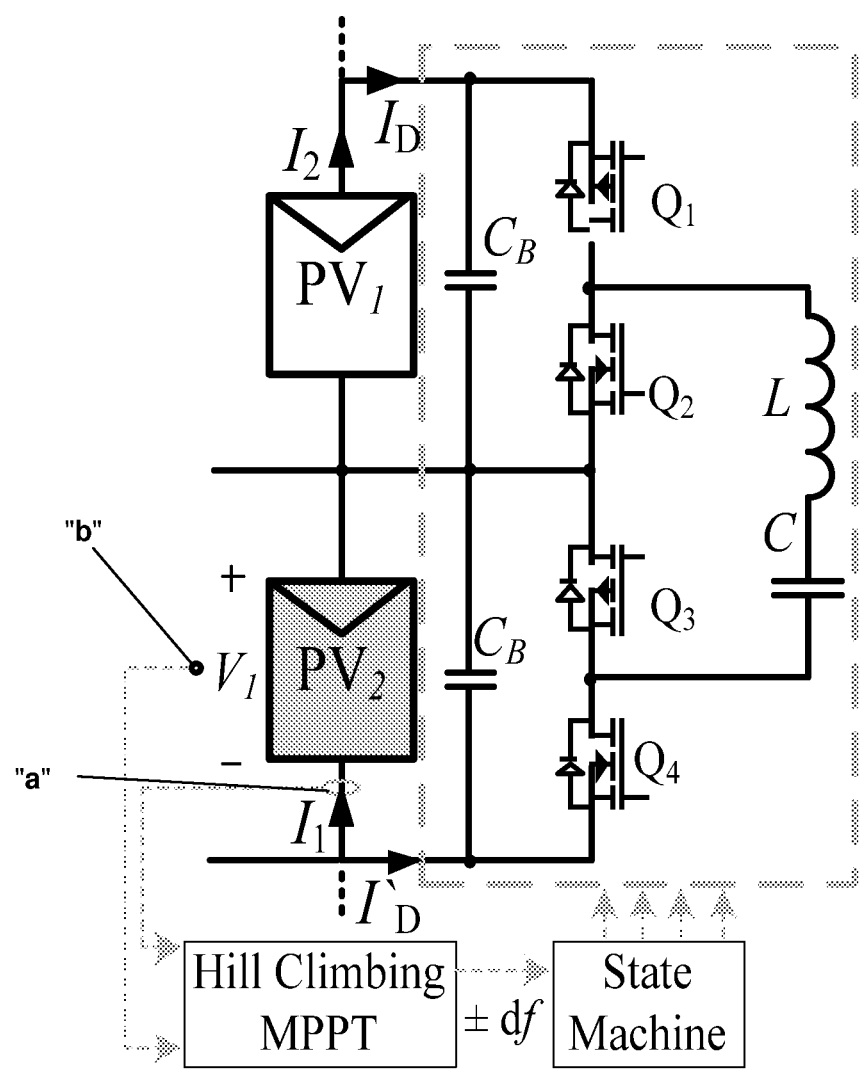
FIG. 3 illustrates the configuration of the novel resonant SCC converter as a DPP, according to an embodiment of the invention.

FIG. 3 illustrates the configuration of the novel resonant SCC converter as a DPP, according to an embodiment of the invention. Similar to the architecture of a conventional inverting resonant SCC, the DPP includes four switches $Q_1, \ldots, Q_4$ and a resonant tank consisting of a capacitor C which is serially connected to an inductor L. Two PV elements $PV_1$ and $PV_2$ are connected as input and output sources. $PV_2$ is the shaded element.

Unlike the operation of a conventional SCC that includes a charge and discharge states, here, an additional switching phase is introduced that breaks the rigid connection of input/output voltage gain and efficiency dependency. Controlling the sequence of the switches governs the power flow direction, hence bidirectional step up/down operation.

The operation of the converter, shown in FIG. 3, is described for one steady-state charge/discharge/balance cycle. FIG. 2 illustrates the capacitor voltage, $V_C$, and the resonant tank current, $I_C$, for a case of a MPP mismatch that requires non-unity step-up conversion. By turning $Q_1$, $Q_3$ on, a charge state (S1) is commenced, which resonantly charges the flying capacitor from $PV_1$. At zero current, $Q_1$ and $Q_3$ are turned off while $Q_2$ and $Q_4$ are turned on (state S2). At this point, the flying capacitor resonantly discharges onto the shaded element $PV_2$. If the voltages $V_1$ (of $PV_1$) and $V_2$ (of $PV_2$) are different, only a portion of the charge is delivered to the output. This results in a voltage $V_C$ over the capacitor C that is different than the voltage at the starting point of S1. The amount of this voltage difference (after neglecting the parasitic resistances Rs in each loop) equals to twice the residual voltage of the flying capacitor. By turning $Q_2$ and $Q_3$ on (S3), the resonant tank is short-circuited. This creates the required charge-balance and reverses the flying capacitor voltage polarity such that the voltage at the end of S3 equals to the voltage at the beginning of S1.

The addition of a third, charge balancing state to the switching sequence transforms the resonant SCC into a voltage dependent current-sourcing converter that, neglecting losses, is capable of accommodating any input to output voltage gain (larger and smaller than unity). It should be noted that the order of the sequence will govern the power flow direction. To facilitate regulation of the amount of charge transferred to the output, pulse density modulation (PDM) is employed. A time-delay is introduced between the charge and the discharge states. The average currents ($I_D$ and $I'_D$) and voltages ($V_1$ and $V_2$) of power processor can be defined by a gyrator relationship:

$$I_D = 2fC \cdot V_2; \quad V_1 = \frac{1}{2fC} \cdot I'_D \quad \text{(Eq. 2)}$$

where f is the frequency of a cycle that includes the three stats and the time-delay. Maximum differential current is being passed when no additional time-delay is being added. The relation between the maximum value of the current $I_D$ that passed from $PV_1$ and the voltage $V_2$ of the adjacent $PV_2$ is determined by the capacitive and inductive components of the resonant tank (L, C) according to:

$$I_{Dmax} = \frac{2}{3\pi Z} \cdot V_2; Z = \sqrt{L/C} \quad \text{(Eq. 3)}$$

Assuming that identical parasitic resistances Rs exist in all the three sub-circuits of FIG. 3, the expected efficiency of the converter can be estimated by:

$$\eta = \left[1 + \frac{\pi Rs}{2Z}(A + A^{-1} - 1)\right]^{-1}; A = \frac{V_2}{V_1} \quad \text{(Eq. 4)}$$

As can be seen from Eq. 4 that maximum efficiency is obtained at unity gain (A=1), and it is a function of the ratio between resistance Rs to the resonant network characteristics. Ideally, assuming negligibly small parasitic resistances, the efficiency of the converter would be 100% for any finite conversion ratio. This unique feature which was associated only with Switched-Inductor Converters (SICs), is now made available to resonant SCC as well.

Power Flow Control and Local MPPT

In case of MPP mismatch in more than one element in the chain, the DPPs are required not only to operate at conversion ratios higher or smaller than unity to transfer the current difference required, but also to control the direction of the current toward the 'weaker' (shaded) PV element from both sides of the chain. The switched-capacitor gyrator-type converter, shown in FIG. 3, operates as a current-source and thus is capable of stepping the voltage up or down as required by the load. To deliver power from $V_1$ to $V_2$ the switching sequence will be S1→S2→S3. That is, charge from $V_1$→discharge on $V_2$→and reverse the flying capacitor polarity. In the case of power to be delivered from $V_2$ to $V_1$ the sequence will be changed to be S2→S1→S3.

To fully utilize the benefits of the converter, Zero Current Switching (ZCS) for the entire operation range is essential. Since the resonant characteristics vary with the operating conditions, an adaptive ZCS control scheme is used. The algorithm senses the current at estimated ZCS intervals and adjusts the switching time such that the commutation occurs at zero current.

In this example, the conventional Hill-Climbing (HC) scheme ("A modified adaptive hill climbing MPPT method for photovoltaic power systems," Weidong et al., IEEE 35th Annual PESC 2004, vol. 3, pp. 1957, 1963) was selected for MPPT implementation. HC MPPT provides simple realization based on readily available information, it does not require continuous perturbations and its convergence rate to the MPP can be enhanced. Accordingly, each DPP performs local HC MPPT on one PV element in the chain (in this example, on the lower PV element of each pair).

The sensing points "a" and "b" shown in FIG. 3 are used to sense the current $I_1$ and voltage $V_1$ of the $PV_2$ element, respectively. A controller calculates dP/dV as the error signal and generates a frequency command f, such that the differential current $I_D$, is transferred via the gyrator-type SCC into or out of the controlled PV element. This process is repeated until dP/dV has stabilized in the vicinity of zero, as prescribed by the HC MPPT algorithm.

Convergence to zero value of dP/dV is impractical due to the discrete nature of digital-controller oriented MPPT algorithm. The resolution of the target signal (dP/dV) and the one of the correction signal (f) has to be carefully selected to assure stability around the MPP and avoid limit cycle oscillations. On the other hand, the step size also affects the rate, in which MPPT is obtained. To eliminate oscillations, a small window, Δ, is incorporated in the MPPT algorithm, such that an absolute value of calculated dP/dV less than Δ is considered as zero, indicating that the MPP is reached. The size of Δ is set above the estimated dP/dV that is caused by the converter as a result of control signal step size perturbation around the MPP. By doing so, the MPP error, ΔPerr, is reduced and oscillations are eliminated.

In order to overcome the nonlinear behavior resulting from the fact that the differential current is inversely proportional to the time-delay control command and from the fact that time resolution that is generated digitally, is not constant and strongly depends on the operating point, the correction signal has been modified to frequency, incremented by fixed steps df. By doing so, the power converter can be treated as a constant gain block from frequency to current.

Figure 5:
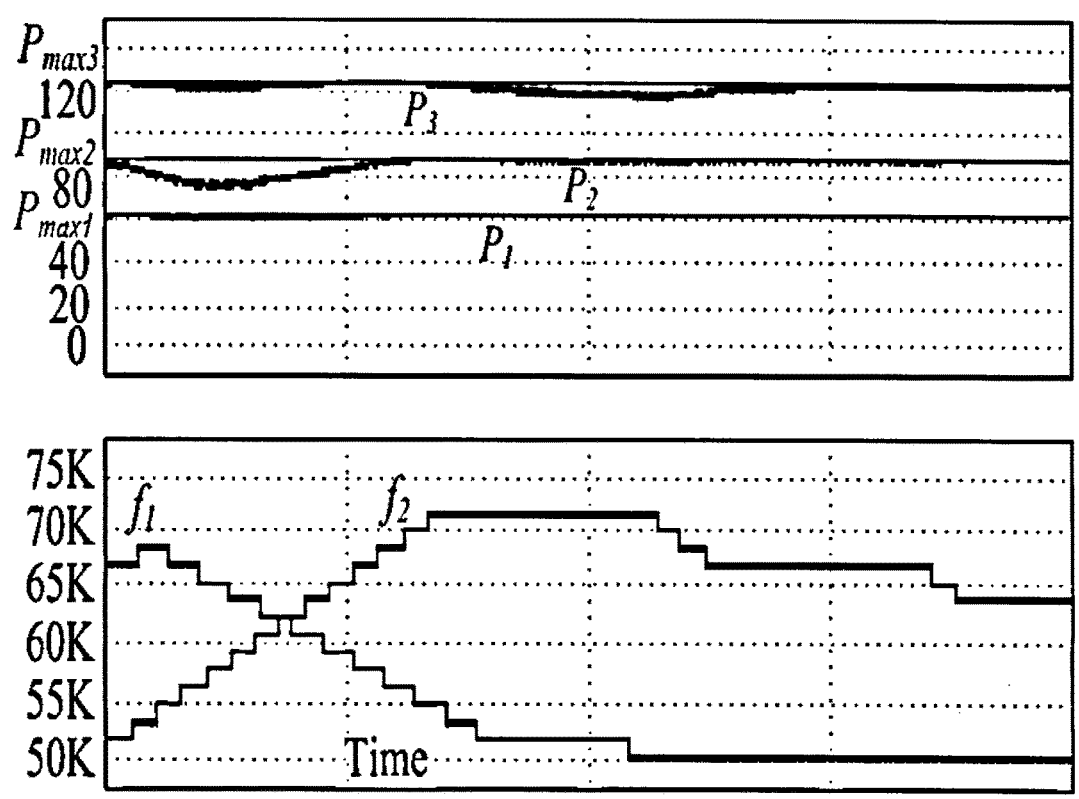
FIG. 5 shows simulation results of individual elements' output power and frequency command.

A simulation test bench has been constructed according to the example illustrated in FIG. 4, with N=3. A load resistance value RLoad mimicking the operation of the central inverter, providing the global MPP according to $$R_{Load} = (\Sigma V_{iMPP})^2 / \Sigma P_{iMPP},$$

where ViMPP and PiMPP are the PVi elements' corresponding MPP voltage and power. The resonant power stage elements' values were C=1 μF, L=μH and Rs=16 mΩ. The MPPT parameters were Δ=1.5Δ and df=1.5 kHz. The results are shown in FIG. 5, with MPP DC error of ΔPerr=1 W and convergence due to fixed df took 35 iterations.

The operation of the differential power architecture was verified experimentally. A 100 W power processor prototype was realized as an inverting bridge configuration as shown in FIG. 3. PMOS transistors were used for $Q_1$ and $Q_3$, and NMOS transistors for $Q_2$ and $Q_4$. The resonant tank parameters were C=1 μF (10×0.1 μF ceramic), L=1 μH. The bus capacitor used was $C_B$=50 μF (5×10 μF ceramic). The gyrator-based DPP was connected between two 180 W, SHARP PV panels (NU-180, E1). Adaptive ZCS and HC MPPT algorithms were implemented digitally on a microcontroller (such as dsPIC33FJ16GS502 of MICROCHIP, Inc., Lexington, Mass., U.S.A.). Dead time between the switches was set to a constant 100 ns.

Figure 6:
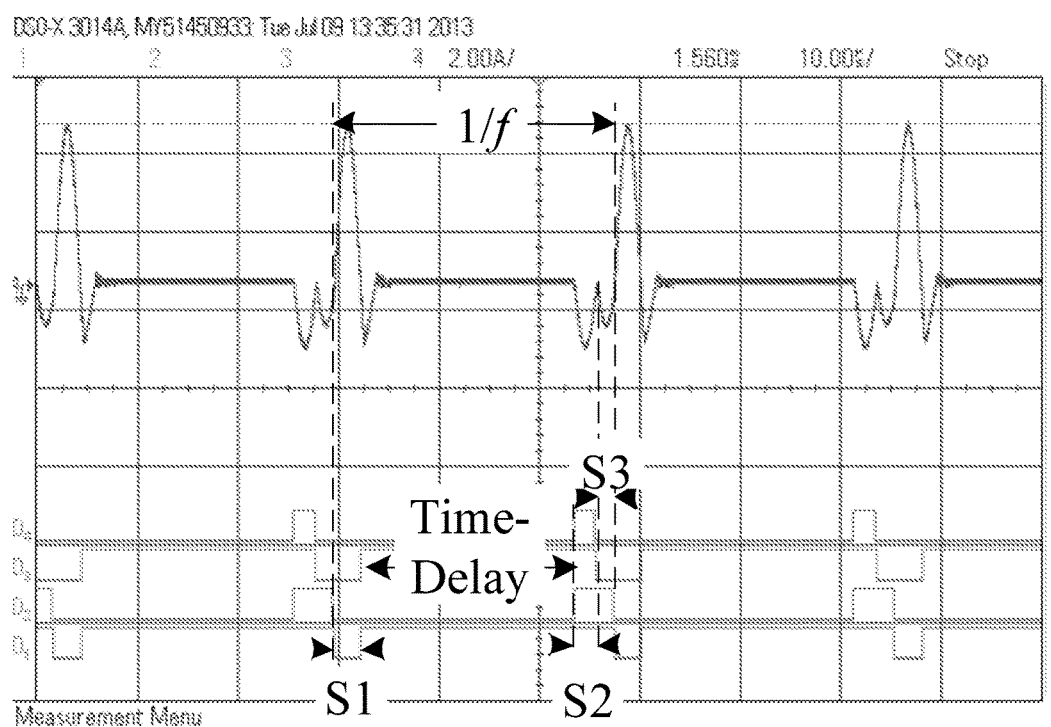
FIG. 6 schematically shows Experimental results of the flying capacitor current and gating signals.
Figure 7:
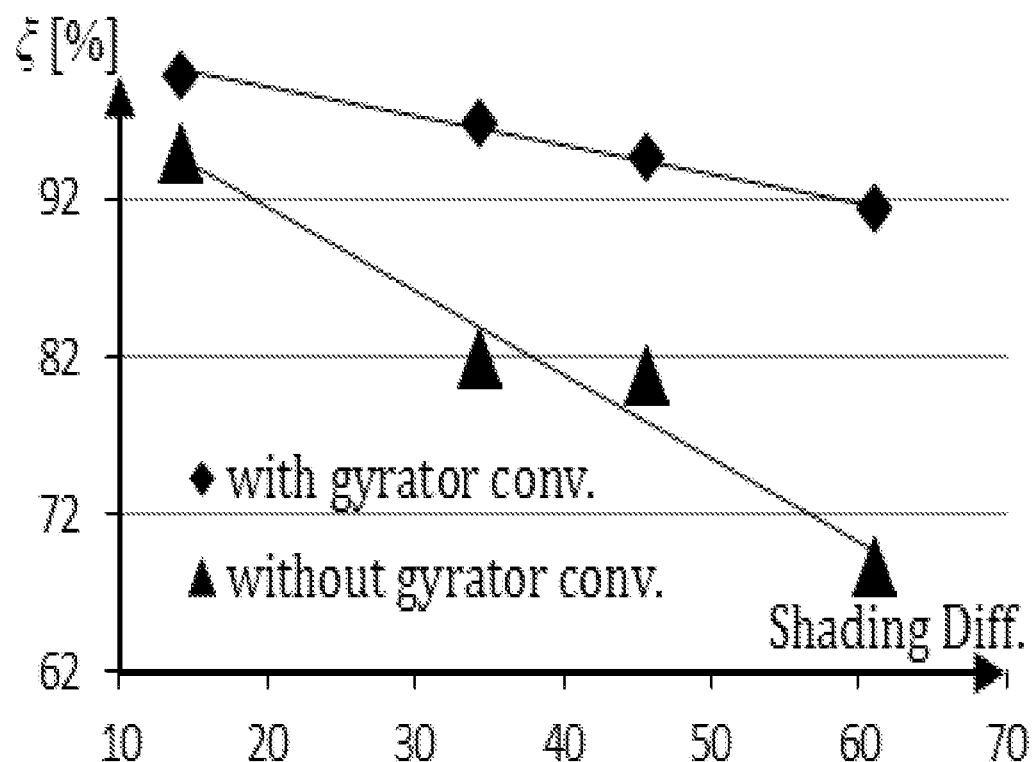
FIG. 7 schematically shows experimental results of harvested power percentage out of the total available power in the chain.

FIG. 6 shows the inductor's current and the gating signals for a transferred differential current of 1.25 A at f=35.8 kHz, for a case of 34% difference between the panels in the power output at the MPP. The improvement in power harvest is illustrated in FIG. 7 for different shading ratios:

$$\xi = P_{out}/(P_{1MPP}P_{2MPP})$$

where $P_{1,2MPP}$ is the absolute maximum PV power and $P_{out}$ in the harvested power from the two PVs connected in a chain. Shading differences are calculated by $P_{2MPP}/P_{1MPP}$ 100%.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A method for increasing the power extraction capability of a chain of serially connected photovoltaic (PV) elements, comprising:
   a) for each pair of adjacent PV elements in the chain of serially connected PV elements, connecting a gyrator-type converter comprising a current sourcing resonant Switched Capacitor Converter (SCC), such that each gyrator-type converter is connected in parallel with the pair of adjacent PV elements;
   b) continuously performing, by each gyrator-type converter, local Maximum Power Point Tracking (MPPT) to one of its two connected PV elements by sinking or sourcing current to/from the neighbouring PV element; and
   c) whenever a mismatch in the Maximum Power Points (MPPs) is detected, using the gyrator-type converters to provide a difference in current that is required for each of the PV elements to operate at its MPP, such that the an amount of power processed by each gyrator-type converter in said chain is proportional to its location in said chain with respect to a PV element in which the mismatch is detected.

2. A method according to claim 1, wherein each gyrator-type converter is bi-directional and capable of performing step-up and step-down operation.

3. A Differential Power Processors (DPP) system for increasing the power extraction capability out of a chain of photovoltaic (PV) elements, comprising:
   a) a chain of N serially connected PV elements;
   b) an array of N−1 gyrator-type converters comprising a current sourcing resonant Switched Capacitor Converter (SCC), each of which being connected in parallel with two adjacent PV elements of the chain of N serially connected PV elements;
   c) continuously performing, by each gyrator-type converter, local Maximum Power Point Tracking (MPPT) to one of its two connected PV elements by sinking or sourcing current to/from the neighbouring PV element; and
   d) whenever a mismatch in the Maximum Power Points (MPPs) is detected, using the gyrator-type converters to provide a difference in current that is required for each of the PV elements to operate at its MPP, such that an amount of power processed by each gyrator-type converter in said chain is linearly proportional to its location in said chain, with respect to a PV element in which the mismatch is detected.

4. A DPP system according to claim 3, in which each gyrator-type converter, connected in parallel with two adjacent serially connected PV elements, comprises:
   a) a resonant tank circuit consisting of a flying capacitor C which is serially connected to an inductor L;
   b) a first switch connecting between a first contact of said resonant tank circuit and a contact of a first PV element of the two adjacent serially connected PV elements;
   c) a second switch connecting between said first contact of said resonant tank circuit and the common contact between said two adjacent serially connected PV elements;
   d) a third switch connecting between the second contact of said resonant tank circuit and said common contact;
   e) a fourth switch connecting between the second contact of said resonant tank circuit and a contact of the second PV element;
   f) a control circuit for controlling operation of said switches, which in a first operation mode, upon detecting a negative mismatch in the MPP of said second PV element, is adapted to:
      f.1) turn said first and third switches on to commence a charge state, during which said flying capacitor C is resonantly charged from said first PV element;
      f.2) at zero current, turn said first and third switches off to introduce time-delay, according to defined requirements;
      f.3) turn said second and fourth switches on, to discharge said flying capacitor resonantly into said second PV element; and
      f.4) at zero current, short-circuit said resonant tank circuit by turning said second and said third switches on, to reverse the polarity of the voltage across said flying capacitor;
   g) and, which in a second operation mode, upon detecting a positive mismatch in the MPP of said second PV element, is adapted to:
      g.1) turn said second and fourth switches on to commence a charge state, during which said flying capacitor C is resonantly charged from said second PV element;
      g.2) at zero current, turn said second and fourth switches off to introduce time-delay, according to the defined requirements;
      g.3) turn said first and third switches on, to discharge said flying capacitor resonantly into said first PV element; and
      g.4) at zero current, short-circuit said resonant tank circuit by turning said second and said third switches on, to reverse the polarity of the voltage across said flying capacitor.

5. A DPP system according to claim 3, in which transfer of energy between PV elements is facilitated in a controlled manner, in portions, where excess charge that is not transferred from said first PV element to said second PV element is recycled in the circuit.

6. A DPP system according to claim 4, in which each gyrator-type converter is bi-directional and capable of performing step-up and step-down operation.

7. A DPP system according to claim 4, in which the control circuit is adapted to control the power flow direction by changing a sequence of switching the switches.

8. A DPP system according to claim 4, in which the control circuit is adapted to regulate an amount of charge transferred to the second element using pulse density modulation (PDM), by introducing time-delay between the charge and the discharge states of the resonant tank circuit, or by creating packets of pulses using ON-OFF burst mode control.

9. A DPP system according to claim 4, wherein the control circuit is adapted to transfer power from the first PV element to the second PV element by controlling the switches to:
   a) charge the resonant tank circuit from said first PV element;
   b) add time-delay according to a necessary amount of power to be transferred;
   c) discharge the resonant tank circuit into said second PV element; and
   d) reverse the polarity of the voltage across the flying capacitor.

10. A DPP system according to claim 4, in which when power should be transferred from the second PV element to the first PV element, wherein the control circuit is adapted to transfer power from the second PV element to the first PV element by controlling the switches to:
  a) discharge the resonant tank circuit into said second PV element;
  b) charge the resonant tank circuit from said first PV element;
  c) add time-delay according to the a necessary amount of power to be transferred; and
  d) reverse the polarity of the voltage across the flying capacitor.

11. A DPP system according to claim 3, in which local MPPT on at least one PV element is performed by using a Hill-Climbing (HC) scheme.

12. A DPP system according to claim 11, in which a correction signal of the Hill-Climbing (HC) scheme is modified as to frequency, incremented by fixed steps.

13. A DPP system according to claim 3, in which local MPPT on at least one PV element is performed by using a Perturb and Observe (P&O) scheme.

14. A method according to claim 1, wherein a proportion of the power processed by each converter in said chain is linear with respect to the mismatched PV element.

\* \* \* \* \*